United States Patent [19]
Carpenter

[11] Patent Number: 5,135,243
[45] Date of Patent: Aug. 4, 1992

[54] CHILD'S CART

[75] Inventor: Bruce R. Carpenter, Oakville, Canada

[73] Assignee: Noma Outdoor Products Inc., Brampton, Canada

[21] Appl. No.: 640,448

[22] Filed: Jan. 11, 1991

[51] Int. Cl.⁵ ............................................. B62B 19/04
[52] U.S. Cl. .................................... 280/7.14; 280/18; 280/87.01
[58] Field of Search ................... 280/7.12, 7.14, 87.01, 280/8, 9, 14, 13, 18, 18.1, 87.021

[56] References Cited

U.S. PATENT DOCUMENTS

| | | | |
|---|---|---|---|
| D. 93,674 | 10/1934 | Rideout | 280/87.01 X |
| 1,681,853 | 8/1928 | Hance | 280/87.01 X |
| 2,420,847 | 5/1947 | Trabucco | 280/87.01 |
| 2,437,903 | 3/1948 | Zullig | 280/270 X |
| 2,470,061 | 5/1949 | Wheeler | 280/87.01 |
| 2,495,128 | 1/1950 | Panik | 280/87.01 X |
| 3,069,182 | 12/1962 | Hufford | 280/87.01 |
| 3,174,767 | 3/1965 | Sendoykas | 280/87.01 X |
| 4,561,664 | 12/1985 | Cashmere | 280/18 |
| 4,923,208 | 5/1990 | Takahashi et al. | 280/47.35 X |

FOREIGN PATENT DOCUMENTS 585178  1/1947  United Kingdom ............... 280/7.12

Primary Examiner—Andres Kashnikow
Assistant Examiner—Michael Mar
Attorney, Agent, or Firm—Kenneth M. Garrett

[57] ABSTRACT

A cart for infants includes a front wheel bogie steerable by means of a handle for the cart. The cart is provided with rear wheels and runners. The wheels are removable without the use of tools and without removal of the handle, whereby the cart may be used as a sled.

14 Claims, 6 Drawing Sheets

CHILD'S CART

FIELD OF INVENTION

This invention relates to a cart for the amusement and perambulation of infants and young children (hereinafter referred to as children). It particularly relates to a cart which may be a wheeled form for rolling over ground surfaces, or in a sled form for sliding thereover.

BACKGROUND OF INVENTION

Perambulators for children usually include a rigid handle attached to a carrying body in which the child is placed, so as to permit a pushing or pulling force to be transmitted to the body whereby it may be controlled on inclined surfaces. It is desirable that wheeled perambulators have steerable wheels, to provide for greater maneuverability. Generally it is desirable that steering forces are transmitted through the handle, which necessitates the handle being secured to the steerable wheels. Where, as herein, it is desired that the perambulator be interconvertible between a wheel for and a sliding form, it is desirable that the handle function be retained even though the wheels are removed. It is desirable that the interconversion be accomplishable without necessitating the use of any tool.

SUMMARY OF THE INVENTION

In accordance with one aspect of the invention, a child's cart includes a cart body having a forward end and a rearward end; the body includes runners extending between proximate each end for supporting the cart for sliding movement in its sled form. The cart also comprises a bogie which includes a pivot unit pivotally attached to the body adjacent the forward end, and a front wheel unit detachably secured to the pivot unit. A handle is secured to the bogie, preferably to the pivot unit portion thereof, so as to be retained thereon irrespective of the presence or the absence of the front wheel unit. A rear wheel unit is detachably secured to the body adjacent the rearward end; the front wheel unit and rear unit together serving to support the body from the ground surface with the runners raised therefrom.

Desirably, the front wheel unit and the pivot unit are couplable together by a mechanical joint through which controlling forces may be transmitted, and the joint is locked together by means of a releasable locking member. Suitably the locking member is in the form of a clip, and the joint is provided with openings in which the clip is slidable.

Also desirably, the runners are unitarily formed with the body of the cart, which may conveniently be hollow walled and formed for example by rotational molding, so as to be stiff but have a light weight.

Preferably the body includes a forward, child transporting compartment and a rearward compartment for transporting a basket. Conveniently the rearward compartment and the basket are provided with cooperating means to permit the mechanical retention of the basket.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
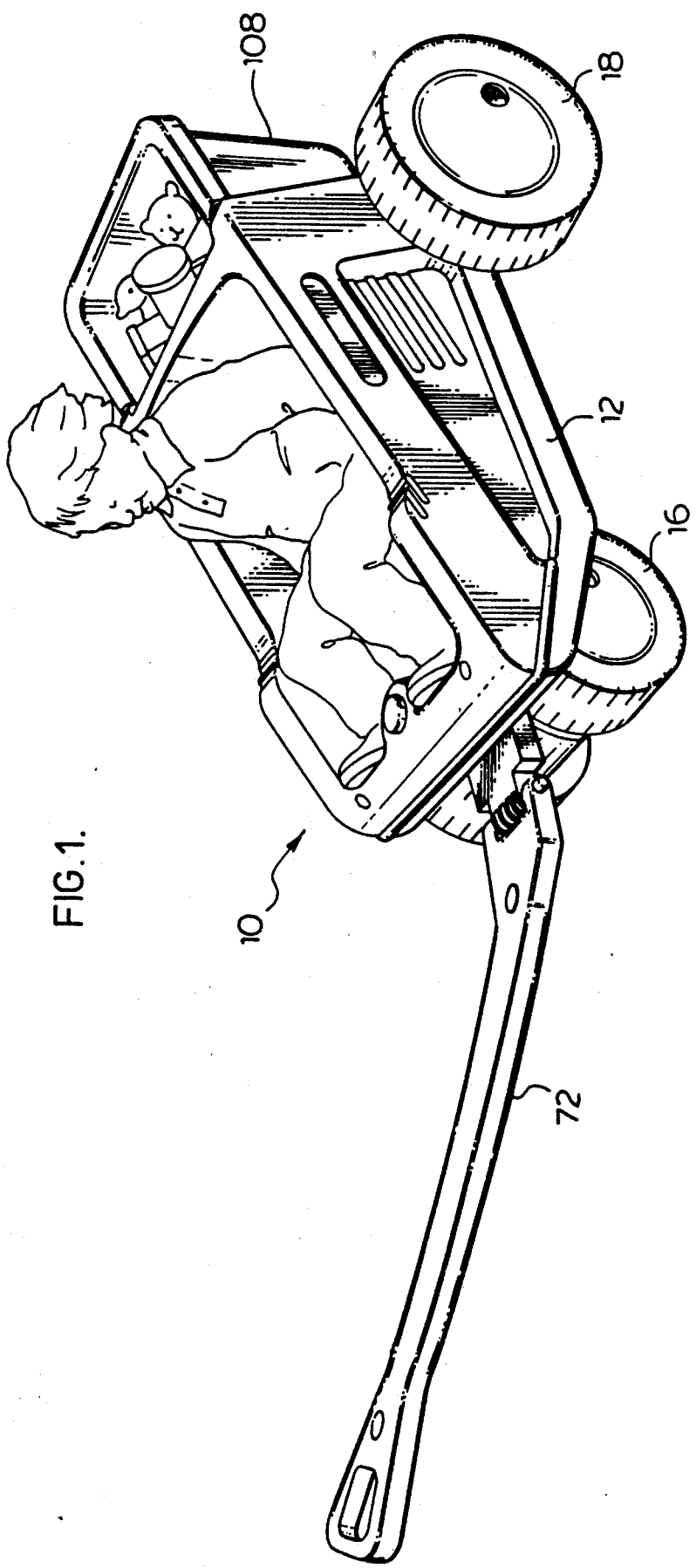
FIG. 1 shows in perspective view from the front left side a child's cart in its wheeled form in accordance with the invention.
Figure 2:
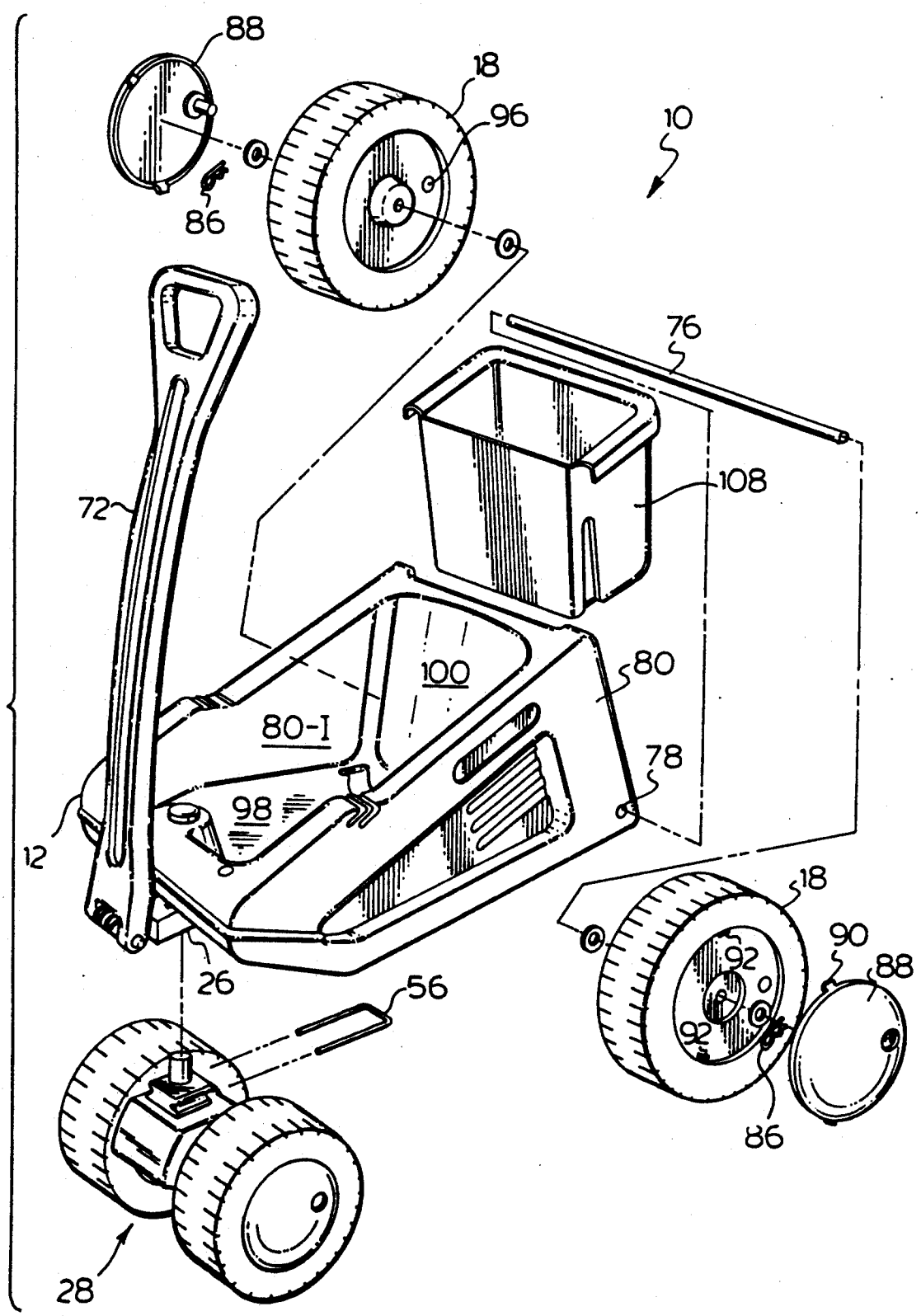
FIG. 2 is similar to FIG. 1, but in exploded form.
Figure 3:
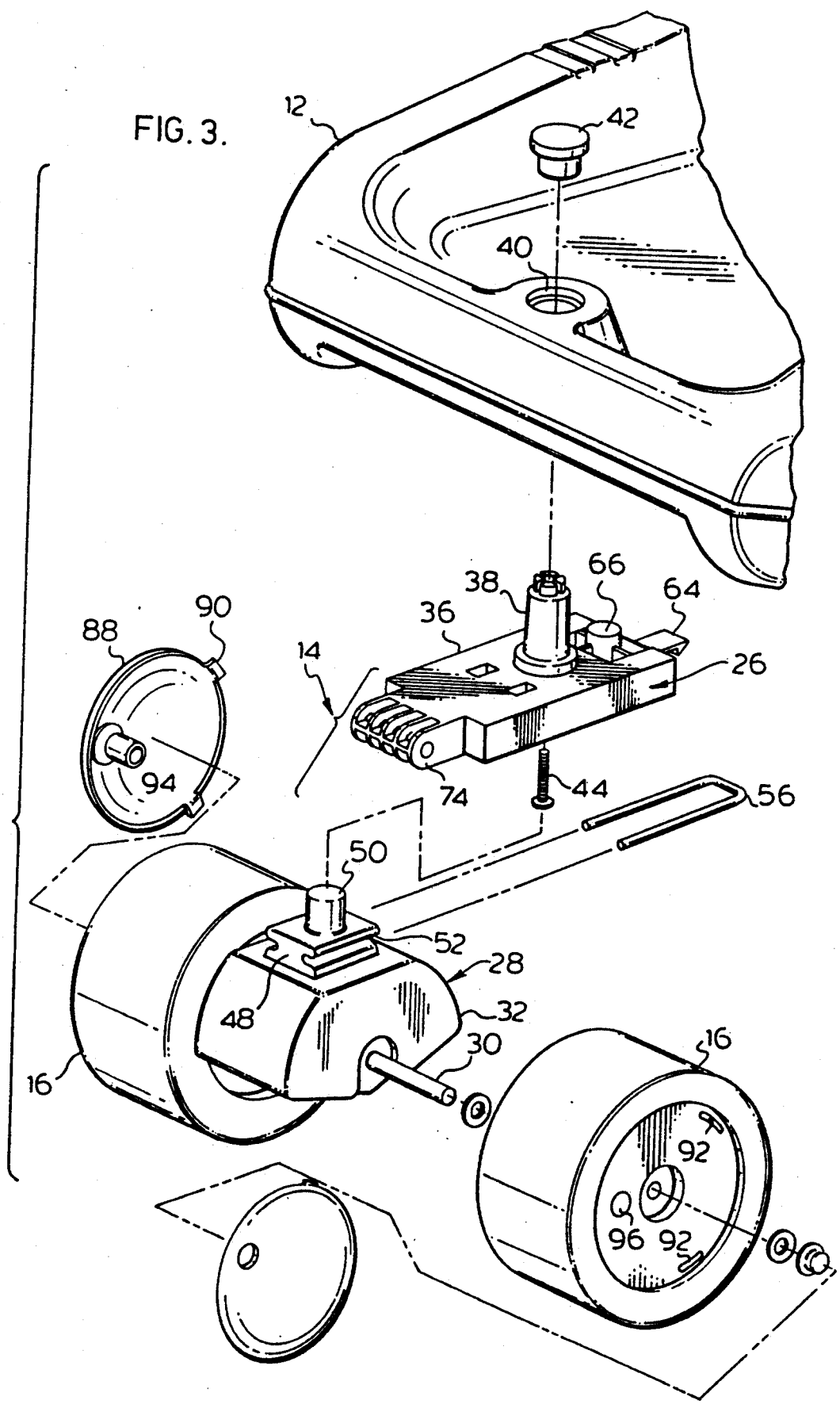
FIG. 3 shows in exploded perspective view the front end of the cart in greater detail.
Figure 4:
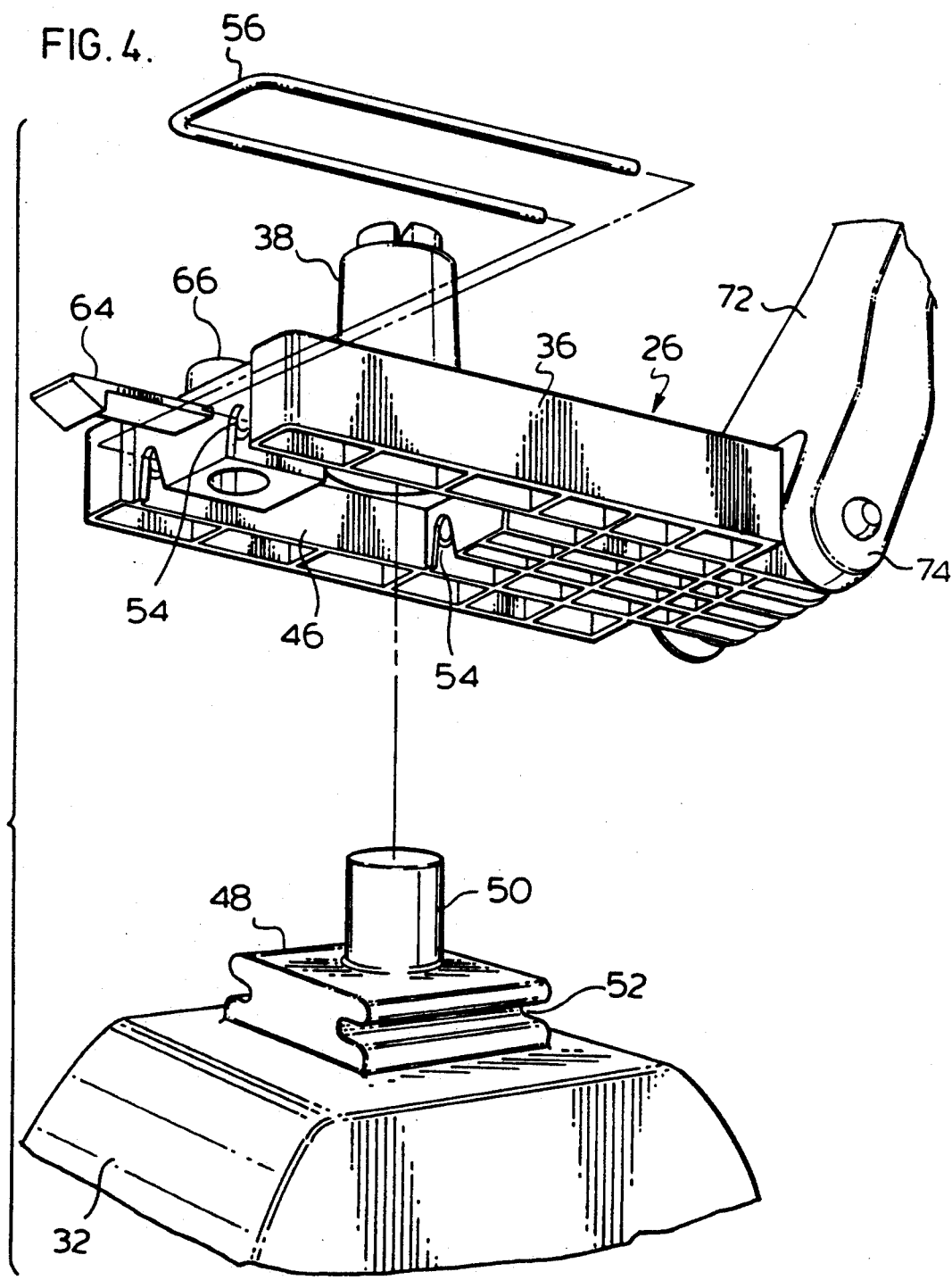
FIG. 4 shows front end components in still greater detail in perspective fragmentary exploded view as seen from the bottom right side.
Figure 5:
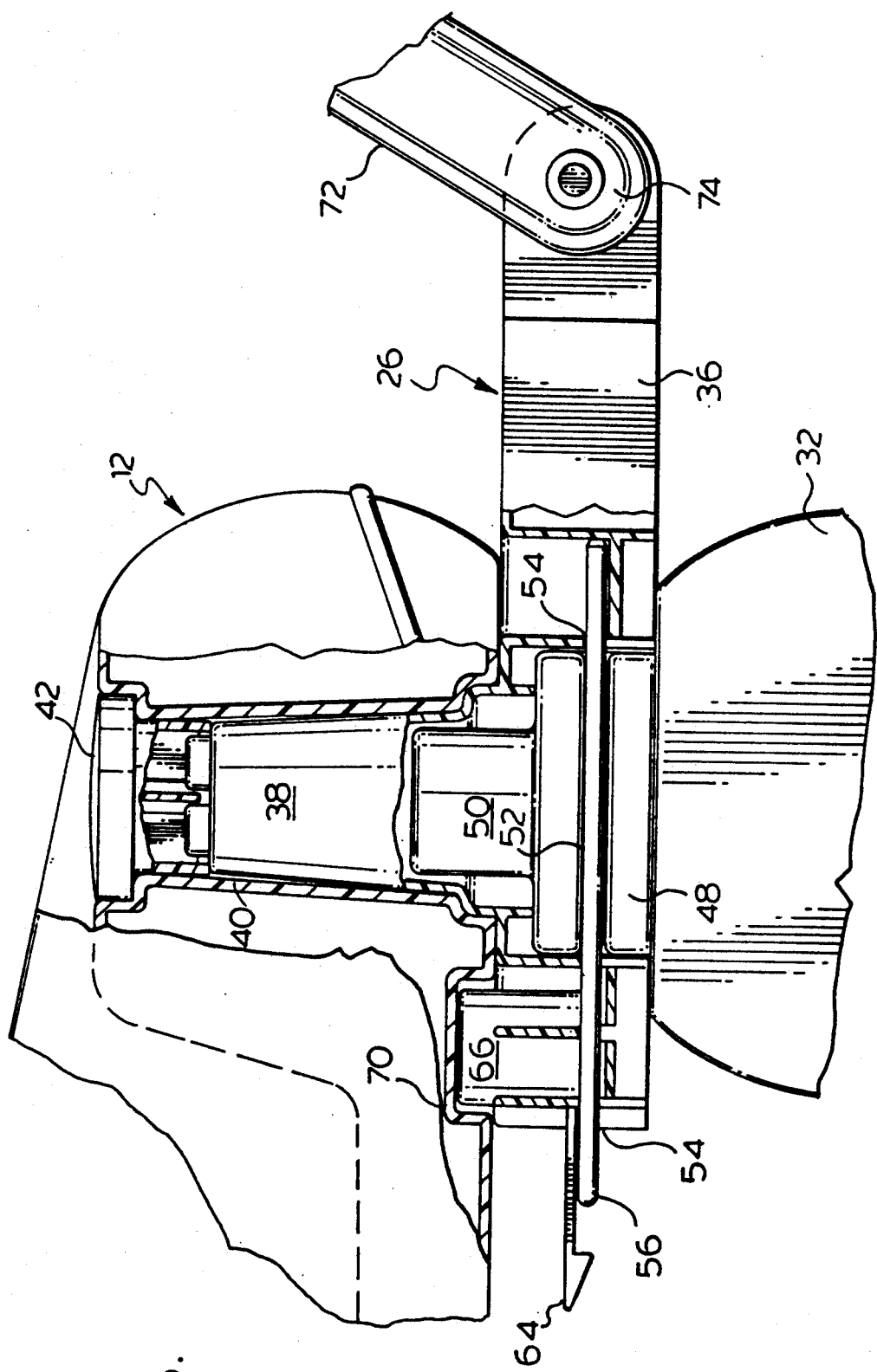
FIG. 5 shows in longitudinal section the elements shown in FIG. 4 in assembled relation with surrounding fragmentary portion of the body of the cart, which is broken away to reveal detail.
Figure 7:
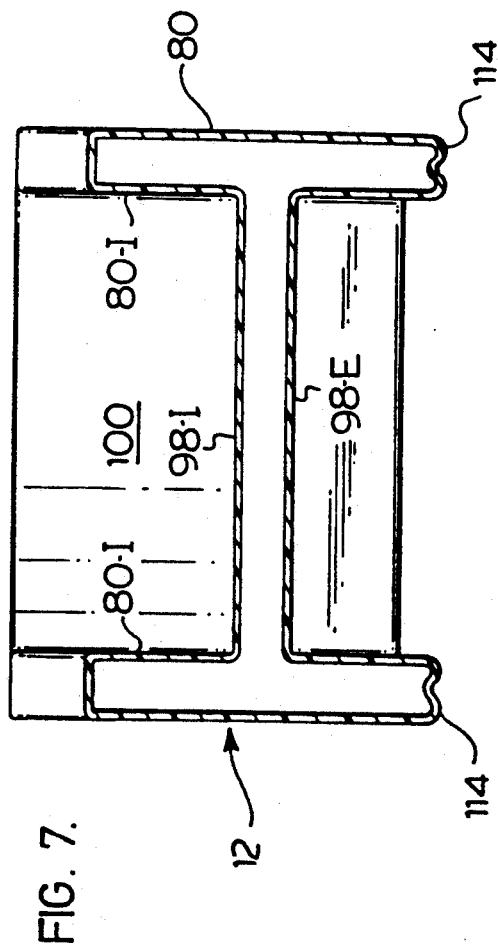
FIG. 7 is a sectional view on 7—7 of FIG. 6.
Figure 6:
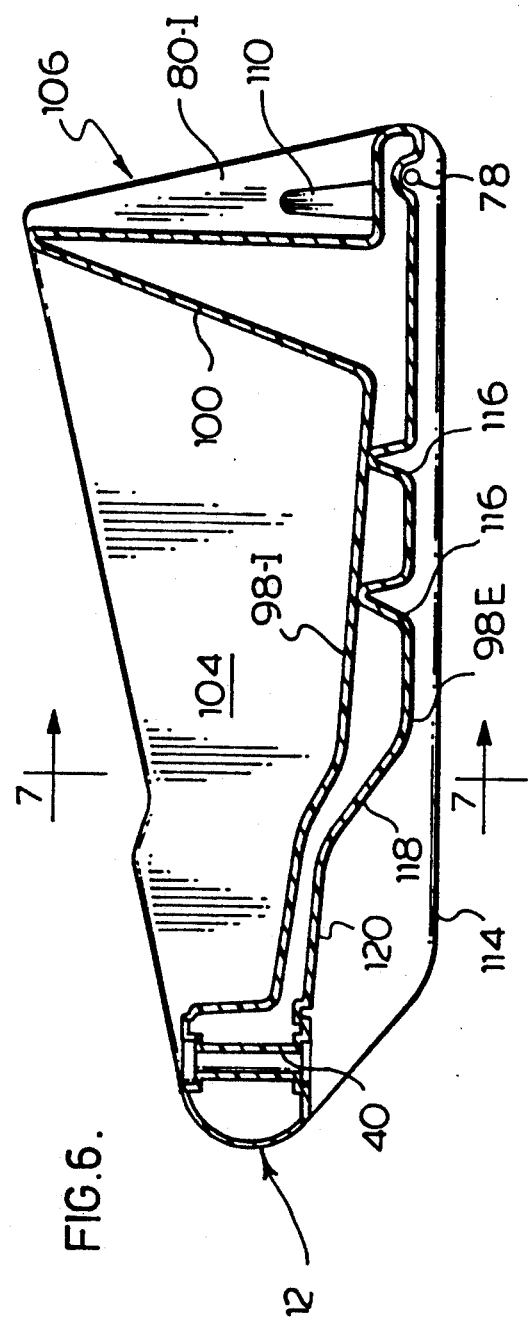
FIG. 6 shows the body of the cart in mid-longitudinal section.

Referring to the drawings in detail, a child's cart in its wheeled form, is identical generally therein by the numeral 10. Cart 10 comprises a body 12, a bogie 14 including front wheels 16 and, rear wheels 18. Bogie 14 comprises two major portions namely a pivot unit 26 and front wheel unit 28, the latter including an axle 30, an axle housing 32 through which the axle passes, and front wheels 16 secured to the axle ends by jam fasteners 34 or any other convenient means.

Pivot unit 26 includes a platform 36 from which is upstanding a hollow gudgeon post 38. Body 12 is centrally provided adjacent the forward end thereof with an opening 40 therethrough into which gudgeon post 38 is rotatably receivable. The upper end of opening 40 is enlarged to provide a seat for a cap 42. A machine screw 44 clamps cap 42 to gudgeon post 38, thereby rotatively capturing platform 26 on body 12.

Platform 36 is provided on the underside thereof with a blind mortise opening 46 therein concentred on the axis of gudgeon post 38. Axle housing 32 has a tenon 48 raised thereon which is cooperatively receivable in mortise opening 46. A small post 50 upstanding from tenon 48 is receivable within the hollow interior of gudgeon pin 38 to facilitate the location of tenon 48 within mortise opening 46 and to enhance the strength of the coupling therebetween. Tenon 48 is provided on each lateral side thereof with a groove 52; a pair of laterally spaced apart openings 54 are provided in platform 36 to align with grooves 52 when the tenon 48 is inserted into mortise opening 46. A U shaped clip 56 have legs 58 interconnected by a bight 60 is receivable in openings 54 and grooves 52 to capture front wheel unit 28 is pivot unit 26. Clip 56 is releasably latched to platform 36 by a small resilient tongue 64 which engages bight 60 when clip 56 is fully inserted into openings 54. A finger 66 is upstanding from platform 12 rearwardly of gudgeon post 38. An arcuate slot 70 is provided in the underside of body 12 concentred on the axis of opening 40, into which slot finger 66 is received, the arrangement serving to limit the rotation of bogie 14. A handle 72 is secured to bogie 14 by a hinge 74 locating at the forward end of platform 36 to permit the handle to move in vertical planes. Handle 72 is rigid and relatively long, so as to permit the cart 10 to be pulled or pushed by an adult, and simultaneously to be steered.

Cart 10 is supported adjacent the rearward end thereof by a rear wheel assembly comprising axle 76 which passes through openings 78 in side walls 80 of body 12, and rear wheels 18 journalled on the ends of axle 76. Wheels 18 are retailed on axle 76 by means of spring clips 86. A wheel trim cover 88 is used to enclose the hub of each wheel 18 and clips 86, front wheels 16 being similarly trimmed. Cover 88 is retained in place by tabs 90 which engage in openings 92 provided therefor in wheels 84 and a post 94 which is receivable in a friction fit in a further opening 96 parallel with axle 76 and which is in communication with each side of wheel 18. Openings 96 have a diameter to permit a small finger, or a pencil or the like to be inserted therein to urge post 94 outwardly from its engaged position. Accordingly, the rear wheel assembly may be mounted on body 12 and dismounted therefrom without the use of any too, as may be front wheel unit 28, whereby cart 10 may be easily interconverted for use as a sleigh and for use as a wheeled cart.

Body 12 comprises in addition to side walls 80 a bottom wall 98 and a rear wall 100 interconnecting the side walls and bottom wall. Conveniently and preferably, body 12 is formed by rotational molding and each of the walls is hollow and comprises an interior facing wall portion and an exterior facing wall portion, which portions are differentiated where it is necessary to distinguish between them by the addition of the letter "I" or "E" to the numeral corresponding to the element. The rear wall 100 serves to divide body 12 into a major, forwardly locating portion 104 to provide a compartment within which a child may be transported, and a minor, rearwardly locating portion 106 to provide a compartment for mounting a carrier basket 108. The rearward portion 106 is provided with upstanding fingers 110 on the interior facing portion 80-I of each side wall 80, and carrier basket 108 is provided with cooperating grooves 112 to retain the basket in position.

Bottom wall 98 secures to side walls 80 above the lower peripheral extremity thereof, whereby such lower extremities form runners 114 for cart 10 when used without wheels. The exterior facing portion 98-E of the bottom wall is inwardly indented at intervals identified by the numeral 116 so as to provide a reinforcing support for the interior portion 98-I thereof. The forward portion of at least the exterior facing portion 98-E thereof is substantially upwardly arched at 118 to provide a wheel arch 120 for bogie 14. The spacing between the interior and exterior portions 98-I and 98-E of the bottom wall is substantially reduced in the vicinity of wheel arch 120 whereby the intrusion of the wheel arch within the child transporting compartment 104 is minimized.

It will be apparent that many changes may be made to the illustrative embodiment, while falling within the scope of the invention and it is intended that all such changes be covered by the claims appended hereto.

I claim:

1. A child's cart comprising:
   a cart body having a forward end and a rearward end;
   said body including runners extending between proximate each said end for supporting said cart from a ground surface for sliding movement thereover;
   a bogie including a pivot unit having a post received within a recessed portion of said cart body for gudgeon securing said bogie to said cart body adjacent said forward end for rotation about a generally vertical axis and a front wheel unit;
   means independent of said gudgeon for detachably coupling said front wheel unit to said pivot unit;
   a steering handle connected to a forward end of said pivot unit independently of said front wheel unit; and
   a rear wheel unit detachably secured to said body adjacent the rearward end thereof;
   said front wheel unit and said rear wheel unit supporting said body from said ground surface with said runners raised thereabove.

2. A cart as defined in claim 1, wherein said handle is connected to said pivot unit by a hinge to permit said handle to move in a generally vertical planes independently of said pivot unit.

3. A cart as defined in claim 1, wherein said means for detachably coupling said pivot unit and said front wheel unit comprises a joint, and wherein a releasable locking member is provided to lock and unlock said joint.

4. A cart as defined in claim 3, wherein said locking member comprises a generally U shaped clip slidable in openings therefor provided in said mechanical joint.

5. A cart as defined in claim 4, including a spring latch for releasably latching said U shaped clip in a locking position.

6. A cart as defined in claim 1, wherein said bogie and said body are provided with cooperating means to limit the rotation of said bogie about said generally vertical axis.

7. A cart as defined in claim 6, wherein said cooperating means comprises a slot and finger arrangement.

8. A cart as defined in claim 1, wherein said first wheel unit includes a pair of wheels.

9. A cart as defined in claim 1, wherein said runners are unitarily formed with said body.

10. A cart as defined in claim 1, wherein said body comprises a bottom wall, a pair of laterally spaced side walls upstanding from said bottom wall, and a rear wall interconnecting said side walls, and wherein said rear wall serves to divide said body into a major, forwardly locating child transporting portion and a minor, rearwardly locating carrier transporting portion.

11. A cart as defined in claim 10, further comprises a carrier basket located in said carrier transporting portion.

12. A cart as defined in claim 11, wherein said carrier basket and said carrier transporting portion are provided with generally vertically arranged cooperating fingers and grooves to permit the detachable securement of said carrier to said body.

13. A cart as defined in claim 10, wherein said each of said walls comprises an interior facing side and an exterior facing side spaced apart from said inwardly facing side to form a hollow structure.

14. A cart as defined in claim 13, wherein the spacing between the inwardly facing side and the exterior facing side forming said bottom wall is decreased adjacent the forward end of said body by upwardly deforming said outwardly facing side thereof to thereby form a wheel arch for said bogie.

* * * * *